United States Patent Office 3,385,174
Patented May 28, 1968

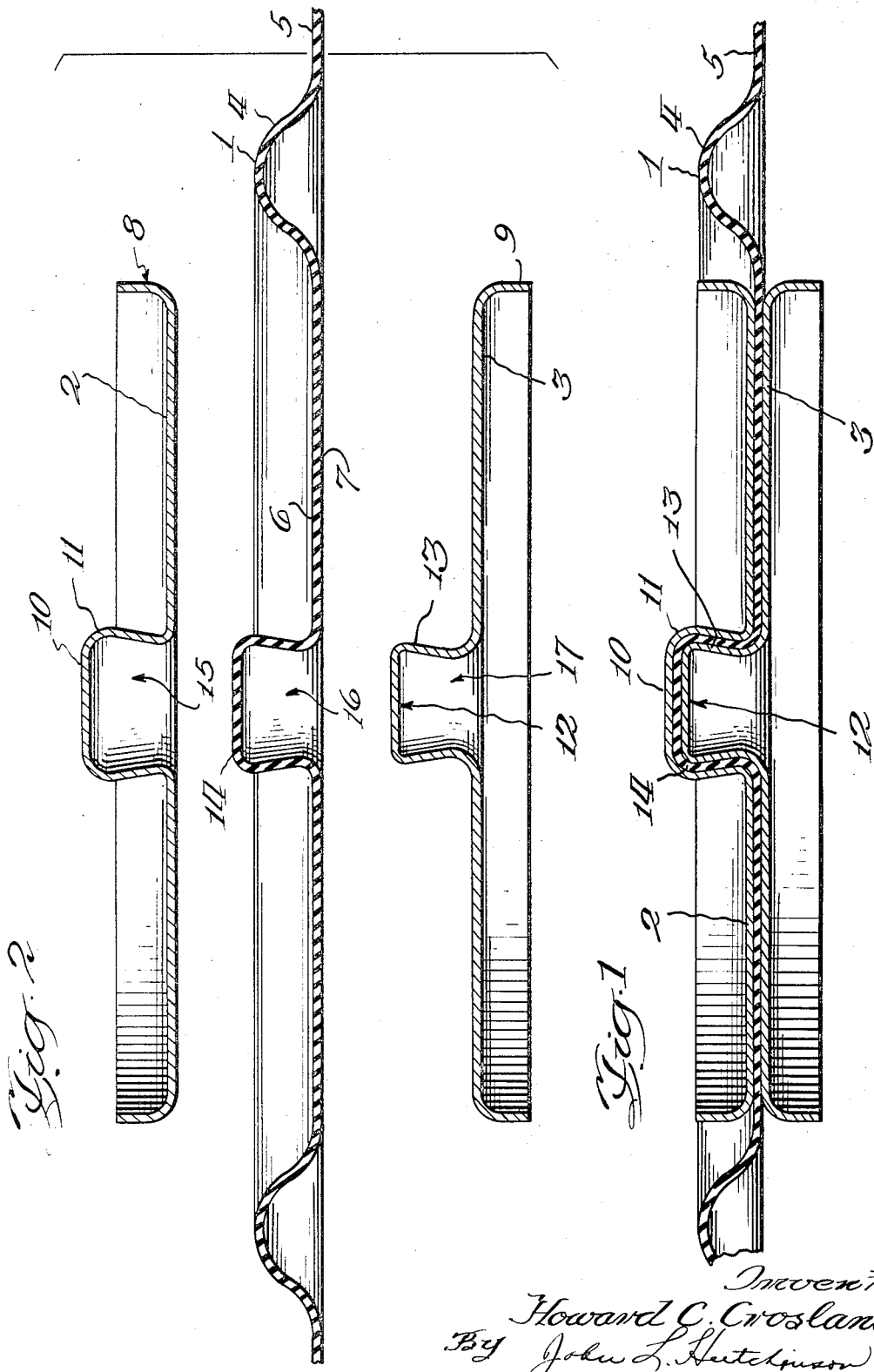

3,385,174
MODIFIED DIAPHRAGM ASSEMBLY
Howard C. Crosland, Dutchess County, N.Y., assignor to Chemical Rubber Products, Inc., Beacon, N.Y., a corporation of New York
Filed Oct. 4, 1965, Ser. No. 492,383
3 Claims. (Cl. 92—100)

ABSTRACT OF THE DISCLOSURE

A diaphragm assembly with a continuous flexible diaphragm separating two rigid plate members, the two plate members having a recess and a corresponding projection opposite thereof to permit a snap-in fit of the rigid plate members in conjunction with the continuous diaphragm material to hold the assembly together without piercing the diaphragm.

---

This invention relates to continuous diaphragms of the type which may be used in devices such as diaphragm valves, gauges, relays, pumps, regulators, and the like, and more particularly to diaphragm assemblies which include rigid plates and are adapted for connection to mechanical linkages employed in these devices.

Diaphragms are normally flexible dividing membranes which span the gap between moving and stationary members to limit or prevent interchange of a fluid or gas between two separated areas or chambers. They generally comprise a non-metallic flexible material having rubber-like properties and may include a substrate such as cotton, nylon or similar material impregnated or coated with an elastomer. Usually, they are a few thousandths of an inch in thickness.

Diaphragms are commonly used with mechanical linkages to actuate or to control the above-described devices. With some devices, such as relays and regulators, hydraulic or pneumatic differential pressure causes the diaphragm to move and transmit power through the mechanical linkage to accomplish the desired actuation or control. With other devices, such as valves and pumps, power is transmitted through the mechanical linkage to move the diaphragm which controls the effective cross-sectional area of the valve or pumps fluid from a container.

In many of these uses, the diaphragms form part of assemblies which include rigid members for connection to the mechanical linkages. In the past, the connection between the diaphragms and the rigid members has commonly been accomplished by riveting or bolting the rigid members to the flexible diaphragms or by using adhesives to bond the diaphragms and members together. In the first technique, the diaphragm is pierced and thereby uses its advantage as a total seal. In the second technique, the connection suffers from limitations of the chemical bond and the chemical resistance of the adhesive to fluids in contact with the diaphragm. In addition, these techniques have commonly necessitated scraping the rigid members whenever the diaphragm was replaced.

In some instances, the diaphragm has been altered to include a section having a thickness several times that of the flexible part in order to include a plug or recess for connection to a rigid member. This technique has not been entirely satisfactory since the formation of the thick section significantly adds to the cost of manufacturing the diaphragm. In addition, the thick section of the diaphragm retains some flexibility which limits the bond between the diaphragm and the rigid member.

Accordingly, it is an object of this invention to provide a diaphragm assembly which utilizes a mechanical connection and a continuous diaphragm.

Another object is to provide a diaphragm assembly in which the rigid members and diaphragm are connected with a mechanical rather than a chemical bond and the diaphragm is not pierced.

A further object is to provide a mechanical connection between the diaphragm and rigid members without altering the thickness of the diaphragm.

These and other objects will become more apparent from the drawings and specification describing the invention in more detail hereinafter.

Broadly, the invention comprises a diaphragm assembly which comprises a continuous diaphragm and two rigid plate members separated by the diaphragm. A recess is formed in the first plate member and a complementary projection in the second. The projection is adapted to fit, together with the adjacent diaphragm section, into the recess in a force fit and to hold the assembly together. This connection avoids piercing the diaphragm, the use of chemical bond, and alteration in the size of the flexible diaphragm.

Having thus indicated the general nature of the invention, reference is made to the accompanying drawings forming a part of this specification and showing one illustrative embodiment of the invention, wherein:

FIGURE 1 is a cross-sectional view of the completed diaphragm assembly with its continuous diaphragm 1 separating upper and lower rigid plate members 2 and 3.

FIGURE 2 is a cross-sectional view of the members of the diaphragm assembly separated to illustrate the method of connecting the members together.

Referring to the drawings and in a more detailed description of the invention, the number 1 designates a continuous diaphragm 1 which fits together with upper plate member 2 and lower plate member 3. In this embodiment, diaphragm 1 includes a circular convolution 4 near its periphery which permits movement of the assembly, and an outer ridge 5 which attaches to a stationary housing (not shown) of a diaphragm valve, gauge, pump, or the like.

The diaphragm may be made of any of the customary materials such as a cotton or nylon fabric impregnated with a chemically resistant polymeric composition such as an elastomer, exemplified by neoprene and buna-N.

In addition, diaphragm 1 includes generally flat surfaces 6 and 7 upon which upper and lower plates 2 and 3, respectively, fit. As shown in the drawings, upper plate 2 is provided with an upwardly extending circumferential flange 8 positioned adjacent to convolution 4 and adapted to serve both as a guide for the convolution 4 and as a rigid support for the plate. Lower plate 3 is also provided with outer flange 9 which provides rigidity to the plate. The shape of plate 2 also serves to define the effective area of the diaphragm 1.

In this embodiment, lower plate 3 is fitted onto upper plate 2 by means of a snap-in type of fitting. This fitting is illustrated by centrally located projection 10 with inner walls 11 which slightly flare outwardly as they extend in an upward direction and form a centrally located recess 15. Lower plate 3 has a complementary projection 12 with walls 13 located below recess 15 and adapted to fit, together with the adjacent diaphragm section, into the recess in a force fit and to hold the assembly together. Advantageously, projection 12 flares outwardly in a similar manner to projection 10 to provide a snap-in fit of the projection 12 into recess 15. Also, it is advantageous to preform a projection 14 and corresponding recess 16 in diaphragm 1 prior to connecting the members together in order to limit the degree that the diaphragm is stretched and to provide a good fit of the diaphragm in the recess.

As indicated above, the method of connecting the continuous flexible diaphragm 1 to the two rigid plate members 2 and 3 includes forming recess 15 in plate 2 and a complementary projection 12 in plate 3, positioning the flexible diaphragm 1 between plates 2 and 3, and moving projection 12, together with the adjacent section of diaphragm 1, into the recess in a force fit. Not only does this arrangement provide a quick means for connecting the members together but also provides an inherent alignment of plates 2 and 3.

As shown on the drawings, projections 10 and 12 are closed end projections, with projection 12 forming a corresponding recess 17. The combination of projection 10 and the recess of projection 12 provides an advantageous means for connecting either side of the completed assembley to the mechanical linkage necessary to transmit power to or away from the flexible diaphragm, since the linkage may be snapped onto projection 10 or snapped into the recess of projection 12. In addition, the circular ridges of plates 2 and 3 can serve as bearing surfaces for reaction springs. However, it is understood that other connecting means may be empleoyed such as rivets, bolts or other conventional techniques.

It is to be understood that the embodiment described above is merely one of numerous variations which can be devised on the broad concept by those of ordinary skill in the art and the claims which are appended hereto are not limited to the specific embodiment described.

I claim:

1. A diaphragm assembly for connection to a mechanical linkage and comprising a continuous flexible diaphragm and two rigid plate members separated by said diaphragm, the first plate member having a recess with walls which slightly flare outwardly as they extend upwardly and the second plate member having a complementary projection located below the recess and adapted to fit, together with the adjacent diaphragm section, into the recess in snap-in fit and to hold the assembly together, the adjacent diaphragm section being preformed into a projection and corresponding recess in order to limit the degree that the diaphragm is stretched during assembly.

2. The diaphragm assembly of claim 1 wherein the recess of the first rigid plate member has a centrally located projection with inner walls which form the recess.

3. The diaphragm assembly of claim 2 wherein the flexible diaphragm includes a convolution near its periphery, and the first plate member includes an upwardly extending circumferential flange positioned adjacent to the convolution and adapted to serve as a guide for the convolution.

References Cited

UNITED STATES PATENTS

| | | | |
|---|---|---|---|
| 2,548,004 | 4/1951 | Duefrene | 24—208.2 |
| 2,886,011 | 5/1959 | Radford | 92—100 X |
| 2,936,776 | 5/1960 | Veatch | 251—331 |
| 3,040,473 | 6/1962 | Wetzler | 29—453 |
| 3,067,764 | 12/1962 | Geary | 92—99 |

FOREIGN PATENTS 49,645 11/1934 Denmark.

MARTIN P. SCHWARDRON, *Primary Examiner.*

I. C. COHEN, *Assistant Examiner.*